United States Patent
Wu et al.

(10) Patent No.: US 12,507,114 B2
(45) Date of Patent: Dec. 23, 2025

(54) BUFFER STATUS REPORTING

(71) Applicant: NOKIA TECHNOLOGIES OY, Espoo (FI)

(72) Inventors: Chunli Wu, Beijing (CN); Benoist Pierre Sebire, Tokyo (JP)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 19/087,173

(22) Filed: Mar. 21, 2025

(65) Prior Publication Data

US 2025/0220500 A1 Jul. 3, 2025

Related U.S. Application Data

(63) Continuation of application No. PCT/CN2023/078262, filed on Feb. 24, 2023.

(51) Int. Cl.
*H04W 28/02* (2009.01)
*H04W 28/14* (2009.01)

(52) U.S. Cl.
CPC ....... *H04W 28/0278* (2013.01); *H04W 28/14* (2013.01)

(58) Field of Classification Search
CPC .......................... H04W 28/0278; H04W 28/14
See application file for complete search history.

(56) References Cited

U.S. PATENT DOCUMENTS

| 2013/0089057 A1 | 4/2013 | Worrall et al. |
| 2022/0022093 A1 | 1/2022 | Liu et al. |
| 2022/0046464 A1 | 2/2022 | Lee et al. |
| 2024/0015573 A1* | 1/2024 | Pradas .................. H04W 72/21 |
| 2024/0284249 A1* | 8/2024 | Wei ..................... H04W 72/231 |

(Continued)

FOREIGN PATENT DOCUMENTS

| EP | 3120607 A1 | 1/2017 |
| EP | 3297355 A1 | 3/2018 |
| WO | WO 2015/142082 A1 | 9/2015 |

(Continued)

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 12)", 3GPP TS 36.321 v12.9.0, (Mar. 2016), 77 pages.

(Continued)

*Primary Examiner* — Donald L Mills
(74) *Attorney, Agent, or Firm* — ALSTON & BIRD LLP

(57) ABSTRACT

Embodiments of the present disclosure relate to devices, methods, apparatuses and computer readable storage media of BSR. The method comprises obtaining a configuration at least for a first type of BSR MAC CE and for a second type of BSR MAC CE, the configuration defining at least that: either one of the BSR MAC CE types may be used to report buffer status of a LCG, wherein a LCG ID refers to the LCG for which the buffer status is reported, and a LCID of the BSR MAC CE indicates the type of the BSR MAC CE used for reporting the buffer status of the LCG; and transmitting at least one type of BSR MAC CE to a network device based on the configuration.

24 Claims, 5 Drawing Sheets

(56) References Cited

U.S. PATENT DOCUMENTS

2024/0284375 A1* 8/2024 Khoshkholgh Dashtaki .............. H04W 72/21

FOREIGN PATENT DOCUMENTS

| WO | WO 2022/034537 A1 | 2/2022 |
|----|----|----|
| WO | WO-2024096446 A1 * | 5/2024 |
| WO | WO 2024/158611 A1 | 8/2024 |

OTHER PUBLICATIONS

CATT, "The Issues of XR-specific Capacity Improvements", 3GPP TSG-RAN WG2 Meeting #121, R2-2300227, (Feb. 27-Mar. 3, 2023), 6 pages.

CMCC, "Discussion on XR-specific capacity improvement", 3GPP TSG RAN WG2 #121, R2-2301248, (Feb. 26-Mar. 3, 2023), 4 pages.

CMCC, "Enhancement on BSR for XR-specific capacity improvement", 3GPOP TSG RAN WG2 #120, R2-2212636, (Nov. 11-14, 2022), 5 pages.

Dell Technologies, "Dynamic BSR formulation and reporting for XR", 3GPP TSG-RAN WG2 Meeting #121, R2-2300256, (Feb. 27-Mar. 3, 2023), 8 pages.

Google Inc., "XR-Specific capacity improvements", 3GPP TSG-RAN WG2 Meeting #121, R2-2300592, (Feb.-Mar. 2023), 8 pages.

Huawei et al., "Discussion on MAC enhancement for XR-specific capacity improvement", 3GPP TSG-RAN WG2 Meeting #121, R2-2301721, (Feb. 27-Mar. 3, 2023), 6 pages.

International Search Report and Written Opinion for Patent Cooperation Treaty Application No. PCT/CN2023/078262 dated Jul. 12, 2023, 21 pages.

MediaTek Inc., "BSR enhancement for XR capacity", 3GPP TSG-RAN WG2#120, R2-2212318, (Nov. 14-18, 2022), 3 pages.

MediaTek Inc., "Capacity enhancement for XR", 3GPP TSG-RAN WG2 #121, R2-2301423, (Feb. 27-Mar. 3, 2023), 4 pages.

NEC, "Discussion on BSR enhancement for XR", 3GPP TSG-RAN WG2 #121 meeting, R2-2300826, (Feb. 27-Mar. 3, 2023), 7 pages.

Nokia et al., "Capacity improvements", 3GPP TSG-RAN WG2 Meeting #121, R2-2301517, (Feb. 27-Mar. 3, 2023), 6 pages.

Qualcomm Incorporated, "Capacity improvements for XR services", 3GPP TSG-RAN WG2 Meeting #121, R2-2300189, (Feb. 27-Mar. 4, 2023), 7 pages.

Samsung, "Discussion on BSR enhancements for XR", 3GPP TSG RAN WG2 Meeting #121, R2-2301773, (Feb. 27-Mar. 3, 2023), 4 pages.

Spreadtrum Communications, "BSR enhancement on XR", 3GPP TSG-RAN WG2 Meeting #121, R2-2300665, (Feb. 27-Mar. 3, 2023), 4 pages.

Vivo, "Discussion Feedback Enhancements for XR", 3GPP TSG-RAN WG2 Meeting #121, R2-2300325, (Feb. 27-Mar. 3, 2023), 8 pages.

ZTE Corporation et al., "Feedback enhancements for XR capacity", 3GPP TSG-RAN2#120, R2-2211530, (Nov. 2022), 5 pages.

Notice of Reasons for Rejection for Japanese Application No. 2025-532135 dated Oct. 16, 2025, 8 pages.

* cited by examiner

BUFFER STATUS REPORTING

CROSS-REFERENCE TO RELATED APPLICATIONS

This application is a continuation of International Application No. PCT/CN2023/078262, filed Feb. 24, 2023, which is incorporated herein by reference in its entirety.

FIELD

Embodiments of the present disclosure generally relate to the field of telecommunication and in particular to devices, methods, apparatuses and computer readable storage media of buffer status reporting (BSR).

BACKGROUND

The 3rd Generation Partnership Project (3GPP) initiates a study on XR (such as Augmented Reality (AR), Virtual Reality (VR), etc.) enhancements for New Radio (NR). With the development of XR, BSR may need to be further enhanced to accommodate XR service characteristics such as periodicity, multiple flows, jitter, latency, reliability, etc.

SUMMARY

In general, example embodiments of the present disclosure provide a solution of BSR.

In a first aspect, there is provided an apparatus. The apparatus comprises at least one processor; and at least one memory storing instructions that, when executed by the at least one processor, cause the apparatus at least to obtain a configuration at least for a first type of buffer status reporting (BSR) medium access control (MAC) control element (CE) and for a second type of BSR MAC CE, the configuration defining at least that: either one of the BSR MAC CE types may be used to report buffer status of a logical channel group (LCG), wherein a logical channel group identifier (LCG ID) refers to the LCG for which the buffer status is reported, and a logical channel identifier (LCID) of the BSR MAC CE indicates the type of the BSR MAC CE used for reporting the buffer status of the LCG; and transmit at least one type of BSR MAC CE to a network device based on the configuration.

In a second aspect, there is provided an apparatus. The apparatus comprises at least one processor; and at least one memory storing instructions that, when executed by the at least one processor, cause the apparatus at least to obtain a configuration at least for a first type of BSR MAC CE and for a second type of BSR MAC CE, the configuration defining at least that: only the first type of BSR MAC CE may be used to report buffer status of a first set of LCGs and only the second type of BSR MAC CE may be used to report buffer status of a second set of LCGs, and a LCID of the BSR MAC CE indicates the type of the BSR MAC CE used for reporting the buffer status of the LCG; and; and transmit at least one type of BSR MAC CE to a network device based on the configuration.

In a third aspect, there is provided an apparatus. The apparatus comprises at least one processor; and at least one memory storing instructions that, when executed by the at least one processor, cause the apparatus at least to receive, from a terminal device, at least one type of BSR MAC CE and determine buffer status of the terminal device based on the at least one type of BSR MAC CE and a configuration at least for a first type of BSR MAC CE and for a second type of BSR MAC CE defining at least that: either one of the BSR MAC CE types may be used to report buffer status of a LCG, wherein a LCG ID refers to the LCG for which the buffer status is reported, and a LCID of the BSR MAC CE indicates the type of the BSR MAC CE used for reporting the buffer status of the LCG.

In a fourth aspect, there is provided an apparatus. The apparatus comprises at least one processor; and at least one memory storing instructions that, when executed by the at least one processor, cause the apparatus at least to receive, from a terminal device, at least one type of BSR MAC CE and determine buffer status of the terminal device based on the at least one type of BSR MAC CE and a configuration at least for a first type of BSR MAC CE and for a second type of BSR MAC CE defining at least that: only the first type of BSR MAC CE may be used to report buffer status of a first set of LCGs and only the second type of BSR MAC CE may be used to report buffer status of a second set of LCGs, and a LCID of the BSR MAC CE indicates the type of the BSR MAC CE used for reporting the buffer status of the LCG.

In a fifth aspect, there is provide a method. The method comprises obtaining a configuration at least for a first type of BSR MAC CE and for a second type of BSR MAC CE, the configuration defining at least that: either one of the BSR MAC CE types may be used to report buffer status of a LCG, wherein a LCG ID refers to the LCG for which the buffer status is reported, and a LCID of the BSR MAC CE indicates the type of the BSR MAC CE used for reporting the buffer status of the LCG; and transmitting at least one type of BSR MAC CE to a network device based on the configuration.

In a sixth aspect, there is provide a method. The method comprises obtaining a configuration at least for a first type of BSR MAC CE and for a second type of BSR MAC CE, the configuration defining at least that: only the first type of BSR MAC CE may be used to report buffer status of a first set of LCGs and only the second type of BSR MAC CE may be used to report buffer status of a second set of LCGs, and a LCID of the BSR MAC CE indicates the type of the BSR MAC CE used for reporting the buffer status of the LCG; and transmitting at least one type of BSR MAC CE to a network device based on the configuration.

In a seventh aspect, there is provide a method. The method comprises receiving, from a terminal device, at least one type of BSR MAC CE and determining buffer status of the terminal device based on the at least one type of BSR MAC CE and a configuration at least for a first type of BSR MAC CE and for a second type of BSR MAC CE defining at least that: either one of the BSR MAC CE types may be used to report buffer status of a LCG, wherein a LCG ID refers to the LCG for which the buffer status is reported, and a LCID of of the BSR MAC CE indicates the type of the BSR MAC CE used for reporting the buffer status of the LCG.

In an eighth aspect, there is provide a method. The method comprises receiving, from a terminal device, at least one type of BSR MAC CE and determining buffer status of the terminal device based on the at least one type of BSR MAC CE and a configuration at least for a first type of BSR MAC CE and for a second type of BSR MAC CE defining at least that: only the first type of BSR MAC CE may be used to report buffer status of a first set of LCGs and only the second type of BSR MAC CE may be used to report buffer status of a second set of LCGs, and a LCID of the BSR MAC CE indicates the type of the BSR MAC CE used for reporting the buffer status of the LCG.

In a ninth aspect, there is provided an apparatus comprising means for obtaining a configuration at least for a first type of BSR MAC CE and for a second type of BSR MAC CE, the configuration defining at least that: either one of the BSR MAC CE types may be used to report buffer status of a LCG, wherein a logical channel group identifier (LCG ID) refers to the LCG for which the buffer status is reported, and a LCID of the BSR MAC CE indicates the type of the BSR MAC CE used for reporting the buffer status of the LCG; and means for transmitting at least one type of BSR MAC CE to a network device based on the configuration.

In a tenth aspect, there is provided an apparatus comprising means for obtaining a configuration at least for a first type of BSR MAC CE and for a second type of BSR MAC CE, the configuration defining at least that: only the first type of BSR MAC CE may be used to report buffer status of a first set of LCGs and only the second type of BSR MAC CE may be used to report buffer status of a second set of LCGs, and a LCID of the BSR MAC CE indicates the type of the BSR MAC CE used for reporting the buffer status of the LCG; and; and means for transmitting at least one type of BSR MAC CE to a network device based on the configuration.

In an eleventh aspect, there is provided an apparatus comprising means for receiving, from a terminal device, at least one type of BSR MAC CE and means for determining buffer status of the terminal device based on the at least one type of BSR MAC CE and a configuration at least for a first type of BSR MAC CE and for a second type of BSR MAC CE defining at least that: either one of the BSR MAC CE types may be used to report buffer status of a LCG, wherein a LCG ID refers to the LCG for which the buffer status is reported, and a LCID of the BSR MAC CE indicates the type of the BSR MAC CE used for reporting the buffer status of the LCG.

In a twelfth aspect, there is provided an apparatus comprising means for receiving, from a terminal device, at least one type of BSR MAC CE and means for determining buffer status of the terminal device based on the at least one type of BSR MAC CE and a configuration at least for a first type of BSR MAC CE and for a second type of BSR MAC CE defining at least that: only the first type of BSR MAC CE may be used to report buffer status of a first set of LCGs and only the second type of BSR MAC CE may be used to report buffer status of a second set of LCGs, and a LCID of the BSR MAC CE indicates the type of the BSR MAC CE used for reporting the buffer status of the LCG.

In a thirteenth aspect, there is provided a computer readable medium having a computer program stored thereon which, when executed by at least one processor of an apparatus, causes the apparatus to carry out the method according to the fifth aspect, the sixth aspect, the seventh aspect or the eighth aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings.

Throughout the drawings, the same or similar reference numerals may represent the same or similar element.

DETAILED DESCRIPTION

Figure 1:
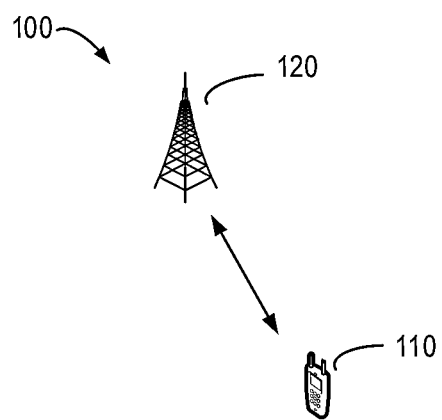
FIG. 1 illustrates an example environment in which example embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein may be implemented in various manners other than the ones described below.

In the following description and claims, unless defined otherwise, all technical and scientific terms used herein may have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first," "second" and the like may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used herein, unless stated explicitly, performing a step "in response to A" does not indicate that the step is performed immediately after "A" occurs and one or more intervening steps may be included.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT), an Enhanced Machine type communication (eMTC) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G), the sixth generation (6G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the terms "network device", "radio network device" and/or "radio access network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), an NR NB (also referred to as a gNB), a Remote Radio Unit (RRU), a remote radio head (RRH), a relay, an Integrated Access and Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. In some example embodiments, low earth orbit (RAN) split architecture includes a Centralized Unit (CU) and a Distributed Unit (DU). In some other example embodiments, part of the radio access network device or full of the radio access network device may embarked on an airborne or spaceborne NTN vehicle.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to a Mobile Termination (MT) part of an IAB node (e.g., a relay node). In the following description, the terms "terminal device", "communication device", "terminal", "user equipment" and "UE" may be used interchangeably.

As used herein, the term "resource," "transmission resource," "resource block," "physical resource block" (PRB), "uplink resource," or "downlink resource" may refer to any resource for performing a communication, for example, a communication between a terminal device and a network device, such as a resource in time domain, a resource in frequency domain, a resource in space domain, a resource in code domain, or any other resource enabling a communication, and the like. In the following, unless explicitly stated, a resource in both frequency domain and time domain will be used as an example of a transmission resource for describing some example embodiments of the present disclosure. It is noted that example embodiments of the present disclosure are equally applicable to other resources in other domains.

FIG. 1 shows an example communication network 100 in which embodiments of the present disclosure may be implemented. As shown in FIG. 1, the communication network 100 may include a terminal device 110. Hereinafter the terminal device 110 may also be referred to as a UE.

The communication network 100 may further include a network device 120. Hereinafter the network device 120 may also be referred to as a gNB or an eNB. The terminal device 110 may communicate with the network device 120.

It is to be understood that the number of network devices and terminal devices shown in FIG. 1 is given for the purpose of illustration without suggesting any limitations. The communication network 100 may include any suitable number of network devices and terminal devices.

In some example embodiments, links from the network device 120 to the terminal device 110 may be referred to as a downlink (DL), while links from the terminal device 110 to the network device 120 may be referred to as an uplink (UL). In DL, the network device 120 is a transmitting (TX) device (or a transmitter) and the terminal device 110 is a receiving (RX) device (or receiver). In UL, the terminal device 110 is a TX device (or transmitter) and the network device 120 is a RX device (or a receiver).

Communications in the communication environment 100 may be implemented according to any proper communication protocol(s), includes, but not limited to, cellular communication protocols of the first generation (1G), the second generation (2G), the third generation (3G), the fourth generation (4G), the fifth generation (5G), the sixth generation (6G), and the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, includes but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

As described above, the BSR may need to be further enhanced to accommodate XR service characteristics, especially the low latency requirement.

Multiple BSR formats have been defined in the specification. For example, the BSR formats may refer to short BSR and short truncated BSR MAC, long BSR and long truncated BSR and extended short BSR and extended short truncated BSR MAC CE. Basically, the BSR may indicated buffered data amount associated with one or more LCG IDs. The buffered data amount may be indicated by the buffer size associated with a certain buffer size table.

For short BSR and short truncated BSR, only BSR of one LCG is reported, with a fixed length of 8 bits, and consists of an LCG ID field with a length of 3 bits and a buffer size field with a length of 5 bits.

The long BSR/long truncated BSR can report the BSR of one or more LCGs. The LCG ID may have a field of 3 bits and can report up to 8 LCGs.

For XR technologies, it has been discussed whether one or more new BSR tables with finer granularities, i.e., buffer size tables need to be added for XR and whether a report of delay information is to be included in the BSR.

Thus, it is not clear when other Logical Channel(s) (LCH(s)) configured to the UE, e.g., Signal Radio Bearers (SRBs) or other services, in addition to the XR service, exist, how the LCHs with or without new BSR table(s) work together. Furthermore, with the new added BSR table(s), the representation of buffered data may also need to be defined.

The solution of the present disclosure proposes a mechanism for BSR, especially for XR. In this solution, as an option, the terminal device 110 may obtain a configuration at least for a first type of BSR MAC CE and for a second type of BSR MAC CE. The configuration may be obtained in a same message or in different messages. The configuration may be preconfigured to the terminal device 110. The configuration may at least define that either one of the BSR MAC CE types may be used to report buffer status of a LCG, wherein a LCG ID refers to the LCG for which the buffer status is reported. In other words, buffer status of any given LCG among plurality of LCGs may use either of the BSR formats for reporting buffer status on that LCG. A LCID of the BSR MAC CE may indicate the type of the BSR MAC CE used for reporting the buffer status of the LCG. The LCID may, in an embodiment, be present in the BSR MAC CE.

As another option, the terminal device 110 may obtain a configuration at least for a first type of BSR MAC CE and for a second type of BSR MAC CE. The configuration may be obtained in a same message or in different messages. The configuration may be preconfigured to the terminal device 110. The configuration may at least define that only the first type of BSR MAC CE may be used to report buffer status of a first set of LCGs and only the second type of BSR MAC CE may be used to report buffer status of a second set of LCGs.

Based on the configuration, the terminal device 110 transmits to the network device 120 at least one type of BSR MAC CE.

In this way, a mechanism for co-existence of LCHs/LCGs configured with a legacy BSR buffer size table associated with a legacy type of BSR MAC CE and a new BSR buffer size table associated with a new type of BSR MAC CE is provided.

Example embodiments of the present disclosure will be described in detail below with reference to the accompanying drawings.

Figure 2:
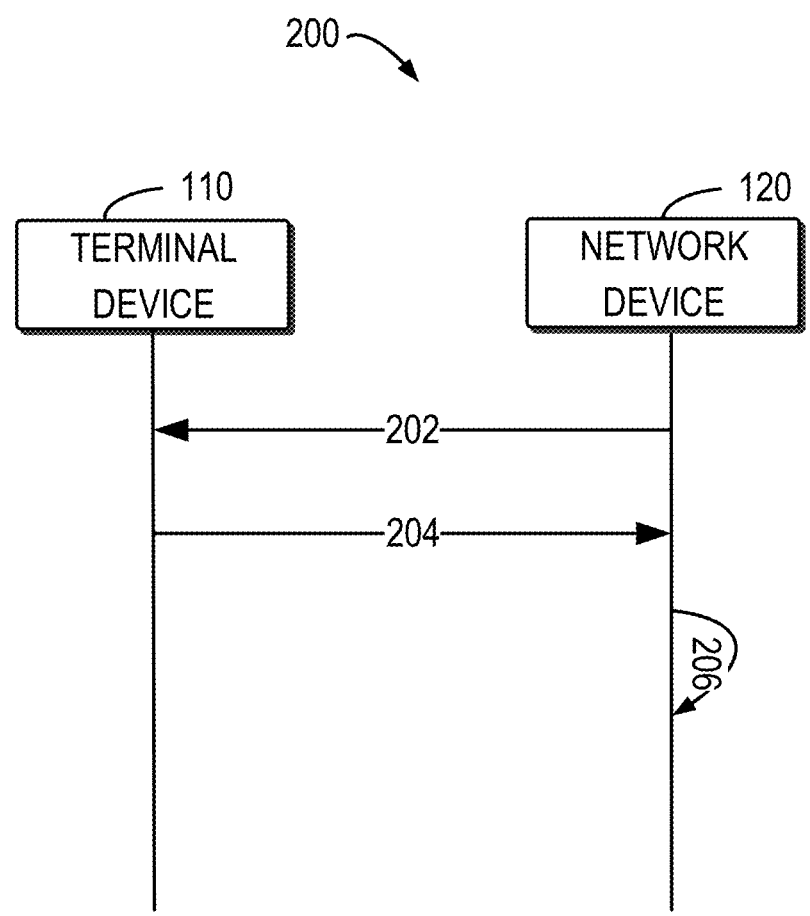
FIG. 2 shows a signaling chart illustrating an example of process according to some example embodiments of the present disclosure.

Reference is now made to FIG. 2, which shows a signaling chart 200 for communication according to some example embodiments of the present disclosure. As shown in FIG. 2, the signaling chart 200 involves the terminal device 110 and the network device 120. For the purpose of discussion, reference is made to FIG. 1 to describe the signaling chart 200.

Assume that multiple types of BSR MAC CE may be used in for buffer status reporting, namely a first type of BSR MAC CE, which may be referred to as a legacy BSR MAC CE and a second type of BSR MAC CE, which may be referred to as a new BSR MAC CE. The type of BSR MAC CE may be indicated by a LCID of the BSR MAC CE. For example, there are 64 LCIDs. LCIDs 0-31 may be used to indicate from which LCH the buffered data is reported and LCIDs 32-64 may be used to indicate the type of the BSR MAC CE. LCID here may refer to extended Logical Channel ID (eLCID) as well.

The first type of BSR MAC CE may be associated with legacy buffer size table(s) and the second type of BSR MAC CE may associated be with new buffer size table(s) or both legacy buffer size table(s) and the new buffer size table(s), which may follow similar formats containing an LCG ID to indicate which LCHs/LCG(s) are being reported.

The terminal device 110 may obtain a BSR configuration at least for a first type of BSR MAC CE and for a second type of BSR MAC CE. For example, as shown in FIG. 2, the terminal device 110 may receive (202) the BSR configuration from the network device 120, for example, via a higher layer signalling, e.g., via a RRC signaling. It is to be understood that the configuration may be pre-defined in the specification, which means the terminal device 110 may be aware of this BSR configuration at least for a first type of BSR MAC CE and for a second type of BSR MAC CE without an explicit signalling from the network device 120.

Then the terminal device 110 may transmit (204), to the network device 120, at least one type of BSR MAC CE based on the configuration at least for a first type of BSR MAC CE and for a second type of BSR MAC CE.

Between steps 202 and 204, the terminal device may determine, based on the configuration, which type of BSR MAC CE, or both, to apply for reporting a buffer status of a given LCG. For example, per configuration, buffer status of a particular LCG may be only reported with certain type of BSR MAC CE. As another example, if both BSR MAC CEs are, per configuration, available for use in reporting buffer status of a particular LCG, then the configuration may provide rules for selection of which BCR MAC CE to use, as will be described later.

The BSR configuration at least for a first type of BSR MAC CE and for a second type of BSR MAC CE may define which type of BSR MAC CE may be used to report buffer status of which LCG. The configuration of which BSR MAC CE to be used could also be for a Logical Channel (LCH), wherein the LCH is configured to an LCG. Thus, the terminal device 110 can derive which type of BSR MAC CE to be used to report buffer status of which LCG. Based on the configuration, the behaviors of the terminal device 110 may be further discussed as below.

In some example embodiments, the BSR configuration at least for a first type of BSR MAC CE and for a second type of BSR MAC CE may at least define either one of the BSR MAC CE types may be used to report buffer status of a LCG, wherein a LCG ID refers to the LCG for which the buffer status is reported. A LCID of a subheader of the BSR MAC CE may indicate the type of the BSR MAC CE used for reporting the buffer status of the LCG.

In this case, a first LCG ID used in the first type of BSR MAC CE and a second LCG ID used in the second type of BSR MAC CE may be associated with or may point towards a same LCG containing the same set of one or more LCHs. For example, LCG ID 1 used in the first type of BSR MAC CE and the LCG ID 1 used in the second type of BSR MAC CE point towards a same LCG. That is, the first LCG ID and the second LCG ID may be with a same index.

The LCID of a BSR MAC CE may indicate which type of the BSR MAC CE is used and no other indication is necessarily needed for the reported LCG to indicate which buffer size table is used. This allows a buffer size of the same LCG to either be reported via the first type of BSR MAC CE and/or the second type of BSR MAC CE, with the LCID of the BSR MAC CE telling which buffer size table was used.

Furthermore, the first type of BSR MAC CE may be associated with a first set of one or more buffer size tables and the second type of BSR MAC CE may be associated with a second set of one or more buffer size tables.

In some examples, the buffer size reported for different LCGs in a type of BSR MAC CE might be associated to different buffer size tables. Which buffer size table(s) to be applicable for which LCG or LCH can be configured by the network.

As an option, the first set of one or more buffer size tables and the second set of one or more buffer size tables may be non-overlapping. As another option, the first set of one or more buffer size tables may have a full range of buffer size and therefore the first set of one or more buffer size tables and the second set of one or more buffer size tables may be at least partially overlapped. The one or more buffer size tables of the second set may provide finer granularities for the buffer size for certain range as that of the one or more buffer size tables of the first set.

In this case, a buffer size table(s) associated with each transmitted BSR MAC CE is indicated by one of a first set of one or more LCIDs associated with the first type of BSR MAC CE or by one of a second set of one or more LCIDs associated with the second type of BSR MAC CE.

The terminal device 110 may decide which buffer size table is used based on the following rules. The rules may be comprised in the configuration.

As an option, the buffer size table selected for one LCH or LCG is the one that provides the smallest difference between the amount of data buffered and buffer size value indicated by the buffer size index, for example with a certain type of BSR MAC CE, because the difference may vary due to the quantization. That is, due to different quantization of different types of BSR MAC CEs (or of the buffer size tables associated with the different types of BSR MAC CEs), the difference to the actual buffered data among may vary for different types of BSR MAC CEs. For example, assume that the first type of BSR MAC CE may be used to indicate a buffer status x, while the actual buffer status at the reported LCG/LCH is y. Assume further that the second type of BSR MAC CE may be used to indicate a buffer status z, where z is closer to y than x. In this case, the second type of BSR MAC CE may be used to report the buffer status of that LCG/LCG.

As another option, if the buffer size of the LCH(s)/LCG(s) to be reported falls out of a range of a buffer size table associated with the second type of BSR MAC CE, the terminal device 110 may fall back to a buffer size table associated with the first type of BSR MAC CE, or vice versa. That is, the terminal device 110 may determine that a buffer size table associated with the first type of BSR MAC CE is to be used instead of a buffer size table associated with the second type of BSR MAC CE.

As described above, in legacy, the long BSR/long truncated BSR can report the BSR of one or more LCGs. The LCG ID may have a field of 3 bits and can report up to 8 LCGs. For the long BSR, when all reported LCHs/LCGs use the same buffer size table, the BSR MAC CE corresponding to that buffer size table is used. Similarly, for new type of BSR MAC CE, LCG ID could be used to indicate which LCGs are reported and buffer status for each LCG could be reported based on new buffer size table(s) (e.g. one or more legacy BSR buffer size tables associated with a legacy type of BSR MAC CE and/or one or more new BSR buffer sizes table associated with a new type of BSR MAC CE).

If not all reported LCHs/LCGs use the same buffer size table, as many BSR MAC CE as buffer size tables needed to report the LCHs/LCGs having data buffered (i.e., non-zero) are then triggered and each LCH/LCG is reported in the BSR whose LCID matches the buffer size table needed.

Alternatively, a single BSR MAC CE can be used to report different LCHs/LCGs applying different buffer size tables. Which buffer size table is applicable to which LCH/

LCG may be configured by the network device 120. The network device 120 knows which buffer size table is to be used for which LCH/LCG in the BSR MAC CE based on the configuration.

In other words, non-zero buffer size for an LCH/LCG having data buffered can only be reported once. The network device 120 may know that no data is buffered for an LCH/LCG if zero buffer size is indicated or a buffer size for the LCG ID is absent (via the LCG ID bitmap) in all BSR MAC CEs.

Owing to the table selection rule(s) described, more precise buffer size of the LCH(s)/LCG(s) could be reported with minimal error due to quantization.

In some other example embodiments, the BSR configuration at least for a first type of BSR MAC CE and for a second type of BSR MAC CE may at least define that only the first type of BSR MAC CE may be used to report buffer status of a first set of LCGs and only the second type of BSR MAC CE may be used to report buffer status of a second set of LCGs. The set of LCGs may be non-overlapping. A LCID of a subheader of the BSR MAC CE may indicate the type of the BSR MAC CE used for reporting the buffer status of the LCG.

In this case, the LCG ID used in the first type of BSR MAC CE (e.g., the legacy BSR MAC CE) and the LCG ID used in the second type of BSR MAC CE (e.g., new BSR MAC CE) are configured separately such that separate LCG ID used for LCHs/LCGs applying the legacy buffer size tables associated with the first type of BSR MAC CE and the LCHs/LCGs applying the new buffer size tables associated with the second type of BSR MAC CE.

As a result, the LCH/LCGs configured as applying the new buffer size table only uses the new BSR MAC CE format with new LCID. The new BSR MAC CE may support only new buffer size table which may also cover the legacy buffer size range or may support both legacy buffer size tables and the new buffer size tables, or may support only new buffer size tables, different from the legacy buffer size tables.

In some example embodiments, a buffer size table associated with each BSR MAC CE may be indicated by one of a first set of one or more LCIDs associated with the first type of BSR MAC CE or by one of a second set of one or more LCIDs associated with the second type of BSR MAC CE.

Comparing to the scenario where either one of the BSR MAC CE types may be used to report buffer status of a same LCG, the number of different LCGs available for use with the first type of BSR MAC CE and the second type of BSR MAC CE may be larger in this option of separate LCG ID pools. This may provide e.g., separate LCG for each LCH.

In this case, the terminal device 110 may determine the type of the BSR MAC CE to be used for reporting the buffer status of the LCG, for example, based on the LCG for which the buffer status is to be reported. The network may know, based on the configuration, which LCGs are associated with which type of BSR MAC CE.

When a same LCH is configured as part of two LCG IDs, the BSR may be then reported twice, for example, with the legacy BSR MAC CE format and the new BSR MAC CE format. Alternatively, the terminal device 110 may be left to choose which buffer size table presents the smaller quantization errors and select the corresponding type of BSR MAC CE accordingly.

Alternatively, or optionally, e.g., the configuration may further define that the terminal device 110 may use legacy BSR MAC CE (i.e., the first type) for an LCH/LCG only when a delay information report is not configured for the LCH/LCG. Or the network device 120 may only configure the terminal device 110 to use legacy BSR MAC CE for an LCH/LCG only when a delay information report is not configured for the LCH/LCG. Otherwise, the new BSR MAC CE is used.

In an embodiment, the delay information defines delay or latency requirements for the data that is buffered in the LCG/LCH. In an embodiment, the delay information is included in the transmitted BSR MAC CE.

After receiving the at least one type BSR MAC CE, as shown in FIG. 2, the network device 120 may determine (206) the buffer status of relevant LCG/LCH at the terminal device 110 based on the configuration of BSR at least for a first type of BSR MAC CE and for a second type of BSR MAC CE.

For example, the network device 120 may determine a buffer size table associated with a received BSR MAC CE in the at least one type of BSR MAC CE based on the LCID of the received BSR MAC CE. Then the network device 120 may determine the buffer status of the relevant LCG/LCH at the terminal device 110 based on the buffer size indicated in the received BSR MAC CE and the determined buffer size table.

In some example embodiments, one example of the buffer size table associated with the second type of BSR MAC CE (e.g., the new BSR MAC CE) may be listed as below. It is to be understood that the buffer size table associated with the second type of BSR MAC CE may not be limited to the example listed as below.

| Index | Current BS value | Proposed BS value based on configuration |
|---|---|---|
| 0 | 0 | 0 |
| 1 | ≤10 | ≤10417 |
| 2 | ≤14 | ≤11135 |
| 3 | ≤20 | ≤11853 |
| 4 | ≤28 | ≤12571 |
| 5 | ≤38 | ≤13289 |
| 6 | ≤53 | ≤14007 |
| 7 | ≤74 | ≤14725 |
| 8 | ≤102 | ≤15443 |
| 9 | ≤142 | ≤16161 |
| 10 | ≤198 | ≤16879 |
| 11 | ≤276 | ≤17597 |
| 12 | ≤384 | ≤18315 |
| 13 | ≤535 | ≤19033 |
| 14 | ≤745 | ≤19751 |
| 15 | ≤1038 | ≤20469 |
| 16 | ≤1446 | ≤21187 |
| 17 | ≤2014 | ≤21905 |
| 18 | ≤2806 | ≤22623 |
| 19 | ≤3909 | ≤23341 |
| 20 | ≤5446 | ≤24089 |
| 21 | ≤7587 | ≤27777 |
| 22 | ≤10570 | ≤25495 |
| 23 | ≤14726 | ≤26213 |
| 24 | ≤20516 | ≤26931 |
| 25 | ≤28581 | ≤27649 |
| 26 | ≤39818 | ≤28367 |
| 27 | ≤55474 | ≤29085 |
| 28 | ≤77284 | ≤29803 |
| 29 | ≤107669 | ≤30521 |
| 30 | ≤150000 | ≤31250 |
| 31 | >150000 | >31250 |

Furthermore, the BSR MAC CE format of the second type of BSR MAC CE (e.g., the new BSR MAC CE) may be configured with a LCID in the subheader and a LCG ID bitmap such that the buffer size index for the LCG(s) may be reported (with its bit set to 1 in the bitmap). Optionally, the BSR MAC CE format of the second type of BSR MAC CE may also have a field for remaining time information for the reported LCG(s) that is configured to report remaining time information. The buffer size index may be mapped to different buffer size tables.

As described above, the solution of the present disclosure proposes a mechanism for co-existence of LCHs/LCGs configured with one or more legacy buffer size tables and one or more new buffer size tables. Meanwhile, a mechanism for fallback to one or more legacy buffer size tables for the LCH/LCGs configured with one or more new buffer size tables is also achieved.

In a case where the separate LCG ID pool can support more LCG IDs, i.e., only the first type of BSR MAC CE may be used to report buffer status of a first set of LCGs and only the second type of BSR MAC CE may be used to report buffer status of a second set of LCGs. Finer granularity of buffer size reporting may be supported, e.g., separate LCG for each LCH.

In a case where a common LCG ID pool is support, i.e., either one of the BSR MAC CE types may be used to report buffer status of a LCG, the terminal device 110 may be allowed to use the one or more legacy buffer size tables with an LCID in the subheader of the BSR MAC CE indicating the use of the new BSR MAC CE, without other additional signalling.

Figure 3:
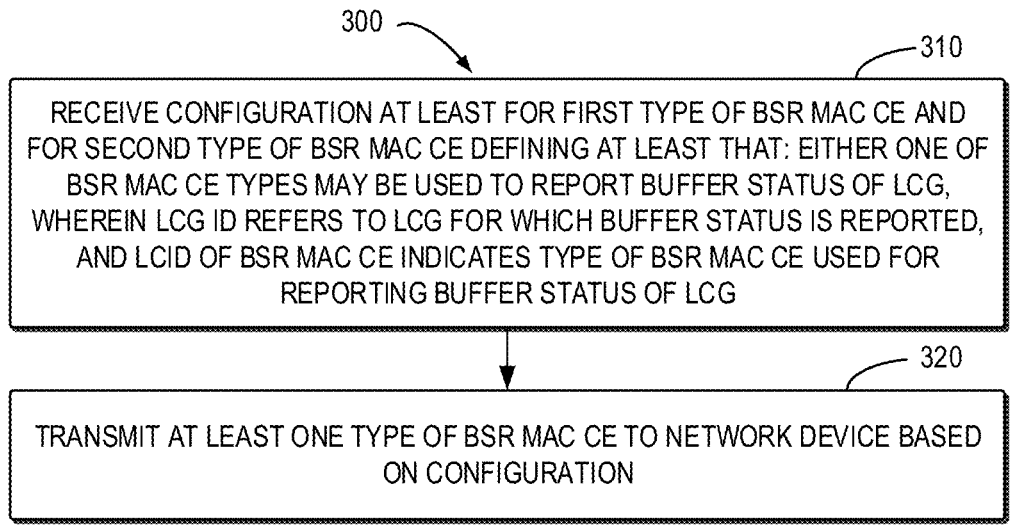
FIG. 3 shows a flowchart of an example method of BSR according to some example embodiments of the present disclosure.

FIG. 3 shows a flowchart of an example method 300 of BSR according to some example embodiments of the present disclosure. The method 300 may be implemented at the terminal device 110 as shown in FIG. 1. For the purpose of discussion, the method 300 will be described with reference to FIG. 1.

At 310, the terminal device 110 obtains a configuration at least for a first type of BSR MAC CE and for a second type of BSR MAC CE, the configuration defining at least that: either one of the BSR MAC CE types may be used to report buffer status of a LCG, wherein a LCG ID refers to the LCG for which the buffer status is reported, and a LCID of the BSR MAC CE indicates the type of the BSR MAC CE used for reporting the buffer status of the LCG.

At 320, the terminal device 110 transmits at least one type of BSR MAC CE to a network device based on the configuration.

In some example embodiments, the first type of BSR MAC CE is associated with a first set of one or more buffer size tables and the second type of BSR MAC CE is associated with a second set of one or more buffer size tables.

In some example embodiments, the first set of one or more buffer size tables and the second set of one or more buffer size tables are non-overlapping.

In some example embodiments, a buffer size table associated with each transmitted BSR MAC CE is indicated by one of a first set of one or more LCIDs associated with the first type of BSR MAC CE or by one of a second set of one or more LCIDs associated with the second type of BSR MAC CE.

In some example embodiments, the terminal device 110 may determine the type of the BSR MAC CE to be used for reporting the buffer status of the LCG, the determining being based on a difference between the buffered data amount on the LCG and buffer size value indicated by the buffer size index with a given type of BSR MAC CE.

In some example embodiments, the BSR MAC CE providing the smallest difference between the buffered data amount and buffer size value indicated by the buffer size index is determined to be used for reporting the buffer status.

In some example embodiments, the terminal device 110 may determine that buffered data amount on the LCG falls out of the range of one or more buffer size tables available for use with the second type of BSR MAC CE; and determine to report the buffer status of the LCG by using the first type of BSR MAC CE.

In some example embodiments, the terminal device 110 may determine a first buffer size table is applicable for reporting the buffer status of a plurality of LCGs; and report the buffer status of the plurality of LCGs with the type of BSR MAC CE that is associated with a buffer size table corresponding to the first buffer size table.

In some example embodiments, the terminal device 110 may determine that different buffer size tables associated with different BSR MAC CE formats are required for reporting the buffer status of a plurality of LCGs having non-zero buffer size; and report the buffer status of the plurality of LCGs with a plurality of BSR MAC CEs.

In some example embodiments, the number of the plurality of BSR MAC CEs corresponds to the number of different buffer size tables required for reporting the buffer status of the one or more LCGs having non-zero buffer size, and wherein each BSR MAC CE comprises an LCID that corresponds to the required buffer size table for the reported LCG.

In some example embodiments, the plurality of BSR MAC CEs are transmitted for reporting the buffer status of the one or more LCGs by using different buffer size tables.

In some example embodiments, the terminal device 110 may refrain from using the first type of BSR MAC CE for reporting buffer status of an LCG when delay information report is configured for that LCG or for a logical channel within the LCG.

Figure 4:
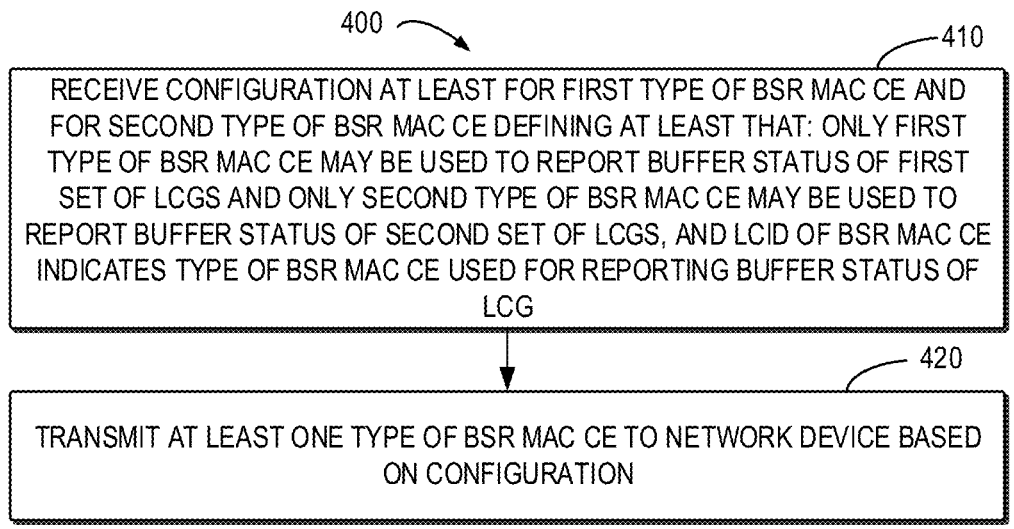
FIG. 4 shows a flowchart of an example method of BSR according to some example embodiments of the present disclosure.

FIG. 4 shows a flowchart of an example method 400 of BSR according to some example embodiments of the present disclosure. The method 400 may be implemented at the terminal device 110 as shown in FIG. 1. For the purpose of discussion, the method 400 will be described with reference to FIG. 1.

At 410, the terminal device 110 obtains a configuration at least for a first type of BSR MAC CE and for a second type of BSR MAC CE, the configuration defining at least that: only the first type of BSR MAC CE may be used to report buffer status of a first set of LCGs and only the second type of BSR MAC CE may be used to report buffer status of a second set of LCGs, and a LCID of the BSR MAC CE indicates the type of the BSR MAC CE used for reporting the buffer status of the LCG.

At 420, the terminal device 110 transmits at least one type of BSR MAC CE to a network device based on the configuration.

In some example embodiments, the first type of BSR MAC CE is associated with a first set of one or more buffer size tables and the second type of BSR MAC CE is associated with a second set of one or more buffer size tables.

In some example embodiments, the second set of one or more buffer size tables comprises at least one of the one or more buffer size tables of the first set.

In some example embodiments, a buffer size table associated with each transmitted BSR MAC CE is indicated by one of a first set of one or more LCIDs associated with the first type of BSR MAC CE or by one of a second set of one or more LCIDs associated with the second type of BSR MAC CE.

In some example embodiments, the number of different LCGs available for use with the first type of BSR MAC CE and the second type of BSR MAC CE is larger than in a scenario where either one of the BSR MAC CE types may be used to report buffer status of a same LCG, wherein each LCID of a BSR MAC CE indicates a different buffer size table used in the BSR MAC CE.

In some example embodiments, the terminal device 110 may determine the type of the BSR MAC CE to be used for reporting the buffer status of the LCG, the determining being based on the LCG for which the buffer status is to be reported.

In some example embodiments, the terminal device 110 may determine that a logical channel, LCH, for which the buffer status is to be reported is associated with an LCG requiring the first type of BSR MAC CE and with an LCG requiring the second type of BSR MAC CE; and transmit both types of BSR MAC CEs to the network device for reporting the buffer status of the LCH.

Figure 5:
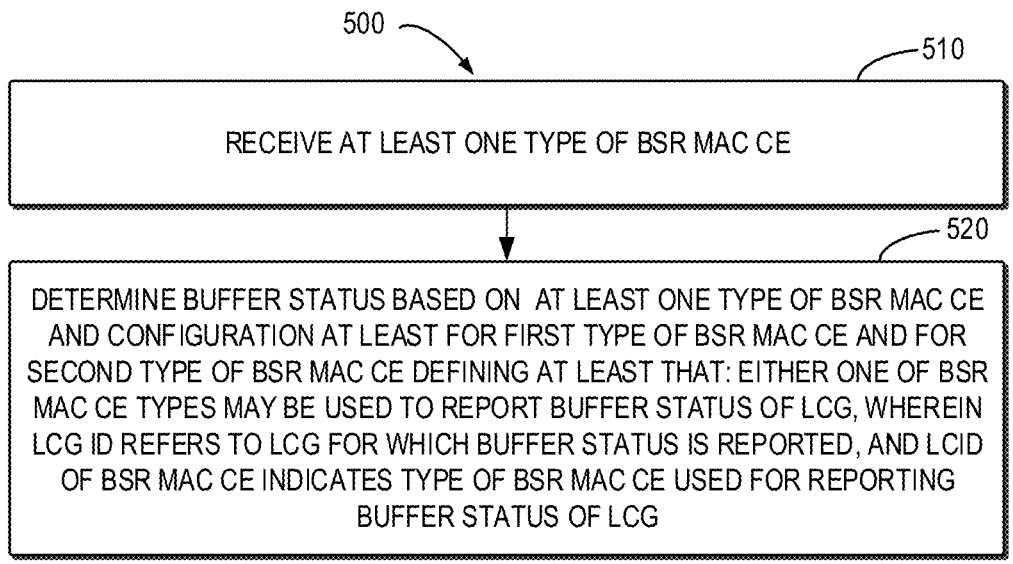
FIG. 5 shows a flowchart of an example method of BSR according to some example embodiments of the present disclosure.

FIG. 5 shows a flowchart of an example method 500 of BSR according to some example embodiments of the present disclosure. The method 500 may be implemented at the network device 120 as shown in FIG. 1. For the purpose of discussion, the method 500 will be described with reference to FIG. 1.

At 510, the network device 120 receives at least one type of BSR MAC CE from the terminal device 110.

At 520, the network device 120 determine buffer status of the terminal device based on the at least one type of BSR MAC CE and a configuration at least for a first type of BSR MAC CE and for a second type of BSR MAC CE defining at least that: either one of the BSR MAC CE types may be used to report buffer status of a LCG, wherein a LCG ID refers to the LCG for which the buffer status is reported, and a LCID of the BSR MAC CE indicates the type of the BSR MAC CE used for reporting the buffer status of the LCG.

In some example embodiments, the first type of BSR MAC CE is associated with a first set of one or more buffer size tables and the second type of BSR MAC CE is associated with a second set of one or more buffer size tables.

In some example embodiments, the first set of one or more buffer size tables and the second set of one or more buffer size tables are non-overlapping.

In some example embodiments, the network device 120 may determine a buffer size table associated with a received BSR MAC CE in the at least one type of BSR MAC CE based on a LCID of the received BSR MAC CE; and determine the buffer status at least based on the buffer size table.

In some example embodiments, in accordance with a determination of a reception of buffer status of a plurality of LCGs with a plurality of BSR MAC CEs, the network device 120 may determine different buffer size tables associated with different BSR MAC CE formats required for reporting the buffer status of the plurality of LCGs having non-zero buffer size.

Figure 6:
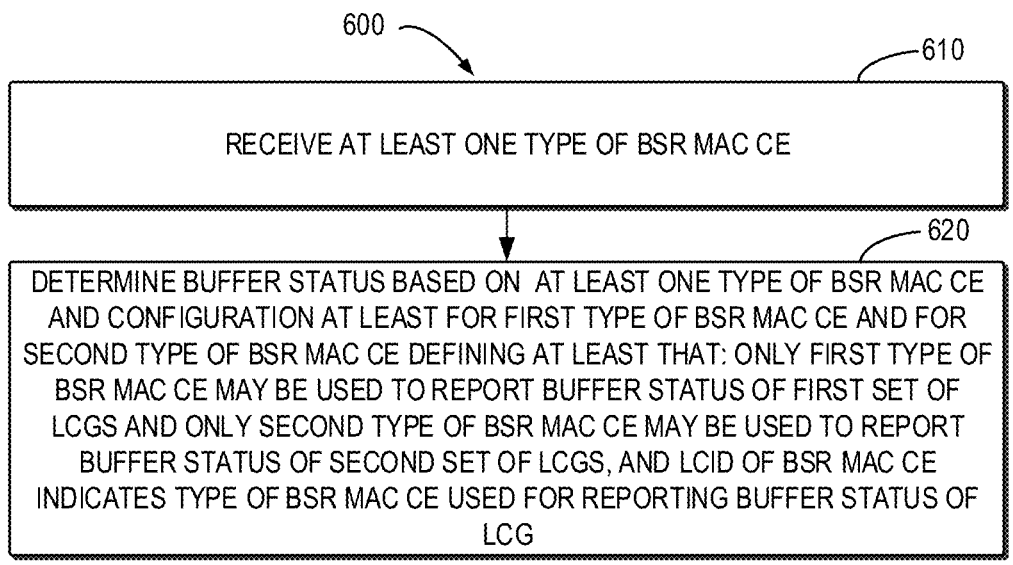
FIG. 6 shows a flowchart of an example method of BSR according to some example embodiments of the present disclosure.

FIG. 6 shows a flowchart of an example method 600 of BSR according to some example embodiments of the present disclosure. The method 600 may be implemented at the network device 120 as shown in FIG. 1. For the purpose of discussion, the method 600 will be described with reference to FIG. 1.

At 610, the network device 120 receives at least one type of BSR MAC CE from the terminal device 110.

At 620, the network device 120 determine buffer status of the terminal device based on the at least one type of BSR MAC CE and a configuration at least for a first type of BSR MAC CE and for a second type of BSR MAC CE defining at least that: only the first type of BSR MAC CE may be used to report buffer status of a first set of LCGs and only the second type of BSR MAC CE may be used to report buffer status of a second set of LCGs, and a LCID of the BSR MAC CE indicates the type of the BSR MAC CE used for reporting the buffer status of the LCG.

In some example embodiments, the first type of BSR MAC CE is associated with a first set of one or more buffer size tables and the second type of BSR MAC CE is associated with a second set of one or more buffer size tables, wherein the second set of one or more buffer size tables comprises at least one of the one or more buffer size tables of the first set.

In some example embodiments, the network device 120 may determine a buffer size table associated with a received BSR MAC CE in the at least one type of BSR MAC CE based on a LCID of the received BSR MAC CE; and determine the buffer status at least based on the buffer size table.

In some example embodiments, the network device 120 may receive, with both types of BSR MAC CEs, the buffer status of a logical channel, LCH, associated with an LCG requiring the first type of BSR MAC CE and with an LCG requiring the second type of BSR MAC CE.

In some example embodiments, an apparatus capable of performing the method 300 (for example, implemented at the terminal device 110) may include means for performing the respective steps of the method 300. The means may be implemented in any suitable form. For example, the means may be implemented in a circuitry or software module.

In some example embodiments, the apparatus comprises means for obtaining a configuration at least for a first type of BSR MAC CE and for a second type of BSR MAC CE, the configuration defining at least that: either one of the BSR MAC CE types may be used to report buffer status of a LCG, wherein a LCG ID refers to the LCG for which the buffer status is reported, and a LCID of the BSR MAC CE indicates the type of the BSR MAC CE used for reporting the buffer status of the LCG; and means for transmitting at least one type of BSR MAC CE to a network device based on the configuration.

In some example embodiments, the first type of BSR MAC CE is associated with a first set of one or more buffer size tables and the second type of BSR MAC CE is associated with a second set of one or more buffer size tables.

In some example embodiments, the first set of one or more buffer size tables and the second set of one or more buffer size tables are non-overlapping.

In some example embodiments, a buffer size table associated with each transmitted BSR MAC CE is indicated by one of a first set of one or more LCIDs associated with the first type of BSR MAC CE or by one of a second set of one or more LCIDs associated with the second type of BSR MAC CE.

In some example embodiments, the apparatus may also comprise means for determining the type of the BSR MAC CE to be used for reporting the buffer status of the LCG, the determining being based on a difference between the buffered data amount on the LCG and data amount possible to be reported with a given type of BSR MAC CE.

In some example embodiments, the BSR MAC CE providing the smallest difference between the buffered data amount and the data amount possible to be reported is determined to be used for reporting the buffer status.

In some example embodiments, the apparatus may also comprise means for determining that buffered data amount on the LCG falls out of the range of one or more buffer size tables available for use with the second type of BSR MAC CE; and means for determining to report the buffer status of the LCG by using the first type of BSR MAC CE.

In some example embodiments, the apparatus may also comprise means for determining a first buffer size table is applicable for reporting the buffer status of a plurality of LCGs; and reporting the buffer status of the plurality of LCGs with the type of BSR MAC CE that is associated with a buffer size table corresponding to the first buffer size table.

In some example embodiments, the apparatus may also comprise means for determining that different buffer size tables associated with different BSR MAC CE formats are required for reporting the buffer status of a plurality of LCGs having non-zero buffer size; and reporting the buffer status of the plurality of LCGs with a plurality of BSR MAC CEs.

In some example embodiments, the number of the plurality of BSR MAC CEs corresponds to the number of different buffer size tables required for reporting the buffer status of the one or more LCGs having non-zero buffer size, and wherein each BSR MAC CE comprises an LCID that corresponds to the required buffer size table for the reported LCG.

In some example embodiments, the plurality of BSR MAC CEs are transmitted for reporting the buffer status of the one or more LCGs by using different buffer size tables.

In some example embodiments, the apparatus may also comprise means for refraining from using the first type of BSR MAC CE for reporting buffer status of an LCG when delay information report is configured for that LCG or for a logical channel within the LCG.

In some example embodiments, an apparatus capable of performing the method 400 (for example, implemented at the terminal device 110) may include means for performing the respective steps of the method 400. The means may be implemented in any suitable form. For example, the means may be implemented in a circuitry or software module.

In some example embodiments, the apparatus comprises means for obtaining a configuration at least for a first type of BSR MAC CE and for a second type of BSR MAC CE, the configuration defining at least that: only the first type of BSR MAC CE may be used to report buffer status of a first set of LCGs and only the second type of BSR MAC CE may be used to report buffer status of a second set of LCGs, and a LCID of the BSR MAC CE indicates the type of the BSR MAC CE used for reporting the buffer status of the LCG; and; and means for transmitting at least one type of BSR MAC CE to a network device based on the configuration.

In some example embodiments, the first type of BSR MAC CE is associated with a first set of one or more buffer size tables and the second type of BSR MAC CE is associated with a second set of one or more buffer size tables.

In some example embodiments, the second set of one or more buffer size tables comprises at least one of the one or more buffer size tables of the first set.

In some example embodiments, a buffer size table associated with each transmitted BSR MAC CE is indicated by one of a first set of one or more LCIDs associated with the first type of BSR MAC CE or by one of a second set of one or more LCIDs associated with the second type of BSR MAC CE.

In some example embodiments, the number of different LCGs available for use with the first type of BSR MAC CE and the second type of BSR MAC CE is larger than in a scenario where either one of the BSR MAC CE types may be used to report buffer status of a same LCG, wherein each LCID of a BSR MAC CE indicates a different buffer size table used in the BSR MAC CE.

In some example embodiments, the apparatus may also comprise means for determining the type of the BSR MAC CE to be used for reporting the buffer status of the LCG, the determining being based on the LCG for which the buffer status is to be reported.

In some example embodiments, the apparatus may also comprise means for determining that a logical channel, LCH, for which the buffer status is to be reported is associated with an LCG requiring the first type of BSR MAC CE and with an LCG requiring the second type of BSR MAC CE; and transmitting both types of BSR MAC CEs to the network device for reporting the buffer status of the LCH.

In some example embodiments, an apparatus capable of performing the method 500 (for example, implemented at the network device 120) may include means for performing the respective steps of the method 500. The means may be implemented in any suitable form. For example, the means may be implemented in a circuitry or software module.

In some example embodiments, the apparatus comprises means for receiving, from a terminal device, at least one type of BSR MAC CE and means for determining buffer status of the terminal device based on the at least one type of BSR MAC CE and a configuration at least for a first type of BSR MAC CE and for a second type of BSR MAC CE defining at least that: either one of the BSR MAC CE types may be used to report buffer status of a LCG, wherein a LCG ID refers to the LCG for which the buffer status is reported, and a LCID of the BSR MAC CE indicates the type of the BSR MAC CE used for reporting the buffer status of the LCG.

In some example embodiments, the first type of BSR MAC CE is associated with a first set of one or more buffer size tables and the second type of BSR MAC CE is associated with a second set of one or more buffer size tables.

In some example embodiments, the first set of one or more buffer size tables and the second set of one or more buffer size tables are non-overlapping.

In some example embodiments, the apparatus may also comprise means for determining a buffer size table associated with a received BSR MAC CE in the at least one type of BSR MAC CE based on a LCID of the received BSR MAC CE; and means for determining the buffer status at least based on the buffer size table.

In some example embodiments, the apparatus may also comprise means for, in accordance with a determination of a reception of buffer status of a plurality of LCGs with a plurality of BSR MAC CEs, determining different buffer size tables associated with different BSR MAC CE formats required for reporting the buffer status of the plurality of LCGs having non-zero buffer size.

In some example embodiments, an apparatus capable of performing the method 600 (for example, implemented at the network device 120) may include means for performing the respective steps of the method 600. The means may be implemented in any suitable form. For example, the means may be implemented in a circuitry or software module.

In some example embodiments, the apparatus comprises means for receiving, from a terminal device, at least one type of BSR MAC CE and means for determining buffer status of the terminal device based on the at least one type of BSR MAC CE and a configuration at least for a first type of BSR MAC CE and for a second type of BSR MAC CE defining at least that: only the first type of BSR MAC CE may be used to report buffer status of a first set of LCGs and only the second type of BSR MAC CE may be used to report buffer status of a second set of LCGs, and a LCID of the BSR MAC CE indicates the type of the BSR MAC CE used for reporting the buffer status of the LCG.

In some example embodiments, the first type of BSR MAC CE is associated with a first set of one or more buffer size tables and the second type of BSR MAC CE is associated with a second set of one or more buffer size tables, wherein the second set of one or more buffer size tables comprises at least one of the one or more buffer size tables of the first set.

In some example embodiments, the apparatus may also comprise means for determining a buffer size table associated with a received BSR MAC CE in the at least one type of BSR MAC CE based on a LCID of the received BSR MAC CE; and means for determining the buffer status at least based on the buffer size table.

In some example embodiments, the apparatus may also comprise means for receiving with both types of BSR MAC CEs, the buffer status of a logical channel, LCH, associated with an LCG requiring the first type of BSR MAC CE and with an LCG requiring the second type of BSR MAC CE.

Figure 7:
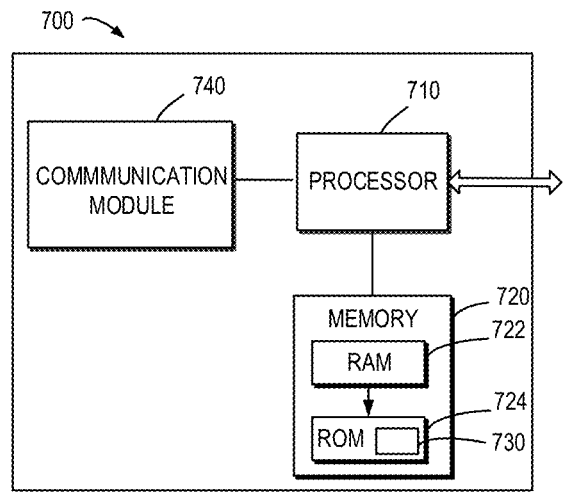
FIG. 7 shows a simplified block diagram of a device that is suitable for implementing example embodiments of the present disclosure.

FIG. 7 is a simplified block diagram of a device 700 that is suitable for implementing example embodiments of the present disclosure. The device 700 may be provided to implement a communication device, for example, the first terminal device 110 or the second terminal device 120 as shown in FIG. 1. As shown, the device 700 includes one or more processors 710, one or more memories 720 coupled to the processor 710, and one or more communication modules 740 coupled to the processor 710.

The communication module 740 is for bidirectional communications. The communication module 740 has one or more communication interfaces to facilitate communication with one or more other modules or devices. The communication interfaces may represent any interface that is necessary for communication with other network elements. In some example embodiments, the communication module 740 may include at least one antenna.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a Read Only Memory (ROM) 724, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 722 and other volatile memories that will not last in the power-down duration.

A computer program 730 includes computer executable instructions that are executed by the associated processor 710. The instructions of the program 730 may include instructions for performing operations/acts of some example embodiments of the present disclosure. The program 730 may be stored in the memory, e.g., the ROM 724. The processor 710 may perform any suitable actions and processing by loading the program 730 into the RAM 722.

The example embodiments of the present disclosure may be implemented by means of the program 730 so that the device 700 may perform any process of the disclosure as discussed with reference to FIG. 2 to FIG. 6. The example embodiments of the present disclosure may also be implemented by hardware or by a combination of software and hardware.

In some example embodiments, the program 730 may be tangibly contained in a computer readable medium which may be included in the device 700 (such as in the memory 720) or other storage devices that are accessible by the device 700. The device 700 may load the program 730 from the computer readable medium to the RAM 722 for execution. In some example embodiments, the computer readable medium may include any types of non-transitory storage medium, such as ROM, EPROM, a flash memory, a hard disk, CD, DVD, and the like. The term "non-transitory," as used herein, is a limitation of the medium itself (i.e., tangible, not a signal) as opposed to a limitation on data storage persistency (e.g., RAM vs. ROM).

Figure 8:
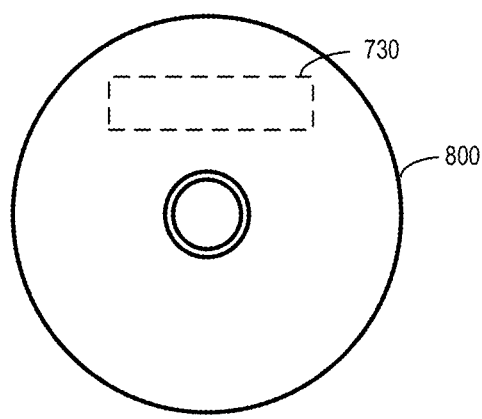
FIG. 8 shows a block diagram of an example computer readable medium in accordance with some embodiments of the present disclosure.

FIG. 8 shows an example of the computer readable medium 800 which may be in form of CD, DVD or other optical storage disk. The computer readable medium 800 has the program 730 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

Some example embodiments of the present disclosure also provide at least one computer program product tangibly stored on a computer readable medium, such as a non-transitory computer readable medium. The computer program product includes computer-executable instructions, such as those included in program modules, being executed in a device on a target physical or virtual processor, to carry out any of the methods as described above. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. The program code may be provided to a processor or controller of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Unless explicitly stated, certain features that are described in the context of separate embodiments may also be implemented in combination in a single embodiment. Conversely, unless explicitly stated, various features that are described in the context of a single embodiment may also be implemented in a plurality of embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. An apparatus comprising:
   at least one processor; and
   at least one memory storing instructions therein that, when executed by the at least one processor, cause the apparatus to perform at least:
   obtaining a configuration at least for a legacy type of buffer status reporting (BSR) medium access control (MAC) control element (CE) and for a new type of BSR MAC CE, wherein the legacy type of BSR MAC CE is associated with a first buffer size table and the new type of BSR MAC CE is associated with the first buffer size table and a second buffer size table, the configuration defining at least that:
      either one of the legacy type of BSR MAC CE or the new type of BSR MAC CE is able to be used to report a buffer status of a logical channel group (LCG), wherein a logical channel group identifier (LCG ID), LEG ID, refers to the LCG for which the buffer status is reported,
      wherein a logical channel identifier (LCID) of the legacy type of BSR MAC CE and the new type of BSR MAC CE indicates the type of the BSR MAC CE used for reporting the buffer status of the LCG;
   determining that a size of buffered data of the LCG falls outside of a range of the second buffer size table; and
   based on the determining that the size of the buffered data of the LCG falls outside of the range of the second buffer size table, transmitting the legacy type of BSR MAC CE to a network device.

2. The apparatus of claim 1, wherein a range of the first buffer size table and the range of the second buffer size table are overlapping.

3. The apparatus of claim 2, wherein the second buffer size table covers only a subrange of the first buffer size table.

4. The apparatus of claim 2, wherein the second buffer size table provides finer granularity than the first buffer size table.

5. The apparatus of claim 1, wherein a buffer size table associated with each transmitted BSR MAC CE is indicated by either: one of a first set of one or more LCIDs associated with the legacy type of BSR MAC CE or one of a second set of one or more LCIDs associated with the new type of BSR MAC CE.

6. The apparatus of claim 1, wherein the instructions stored in the at least one memory, when executed by the at least one processor, further cause the apparatus to perform:
   determining that the first buffer size table is applicable for reporting the buffer status of a plurality of LCGs; and
   reporting the buffer status of the plurality of LCGs with the legacy type of BSR MAC CE.

7. The apparatus of claim 1, wherein the instructions stored in the at least one memory, when executed by the at least one processor, further cause the apparatus to perform:
   determining that different buffer size tables are required for reporting the buffer status of a plurality of LCGs having non-zero buffer size; and
   reporting the buffer status of the plurality of LCGs using the new type BSR MAC CE.

8. The apparatus of claim 1, wherein the instructions stored in the at least one memory, when executed by the at least one processor, further cause the apparatus to perform:
   refraining from using the legacy type of BSR MAC CE for reporting buffer status of an LCG when a delay information report is configured for that LCG or for a logical channel within the LCG.

9. A method comprising:
   obtaining a configuration at least for a legacy type of buffer status reporting (BSR) medium access control (MAC) control element (CE) and for a new type of BSR MAC CE, wherein the legacy type of BSR MAC CE is associated with a first buffer size table and the new type of BSR MAC CE is associated with the first buffer size table and a second buffer size table, the configuration defining at least that:
      either one of the legacy type of BSR MAC CE and the new type of BSR MAC CE is able to be used to report a buffer status of a logical channel group (LCG), wherein a logical channel group identifier (LCG ID) refers to the LCG for which the buffer status is reported,
      wherein a logical channel identifier (LCID) of the legacy type of BSR MAC CE and the new type of BSR MAC CE indicates the type of the BSR MAC CE used for reporting the buffer status of the LCG;
   determining that a size of buffered data of the LCG falls outside of a range of the second buffer size table; and
   based on the determining that the size of the buffered data of the LCG falls outside of the range of the second buffer size table, transmitting the legacy type of BSR MAC CE to a network device.

10. The method of claim 9, wherein a range of the first buffer size table and the range of the second buffer size table are overlapping.

11. The method of claim 10, wherein the second buffer size table covers only a subrange of the first buffer size table.

12. The method of claim 10, wherein the second buffer size table provides finer granularity than the first buffer size table.

13. The method of claim 9, wherein a buffer size table associated with each transmitted BSR MAC CE is indicated by one of a first set of one or more LCIDs associated with the legacy type of BSR MAC CE or by one of a second set of one or more LCIDs associated with the new type of BSR MAC CE.

14. The method of claim 9, further comprising:
determining that the first buffer size table is applicable for reporting the buffer status of a plurality of LCGs; and
reporting the buffer status of the plurality of LCGs with the legacy type of BSR MAC CE.

15. The method of claim 9, further comprising:
determining that different buffer size tables are required for reporting the buffer status of a plurality of LCGs having a non-zero buffer size; and
reporting the buffer status of the plurality of LCGs using the new type BSR MAC CE.

16. The method of claim 9, further comprising:
refraining from using the legacy type of BSR MAC CE for reporting buffer status of an LCG when a delay information report is configured for that LCG or for a logical channel within the LCG.

17. A non-transitory computer-readable storage medium comprising instructions stored therein that, when executed by at least one processor of an apparatus, cause the apparatus to perform at least the following:
obtaining a configuration at least for a legacy type of buffer status reporting (BSR) medium access control (MAC) control element (CE) and for a new type of BSR MAC CE, wherein the legacy type of BSR MAC CE is associated with a first buffer size table and the new type of BSR MAC CE is associated with the first buffer size table and a second buffer size table, the configuration defining at least that:
either one of the legacy type of BSR MAC CE and the new type of BSR MAC CE is able to be used to report a buffer status of a logical channel group (LCG), wherein a logical channel group identifier (LCG ID) refers to the LCG for which the buffer status is reported,
wherein a logical channel identifier (LCID) of the legacy type of BSR MAC CE and the new type of BSR MAC CE indicates the type of the BSR MAC CE used for reporting the buffer status of the LCG;
determining that a size of buffered data of the LCG falls outside of a range of the second buffer size table; and
based on the determining that the size of the buffered data of the LCG falls outside of the range of the second buffer size table, transmitting the legacy type of BSR MAC CE to a network device.

18. The non-transitory computer-readable storage medium of claim 17, wherein a range of the first buffer size table and the range of the second buffer size table are overlapping.

19. The non-transitory computer-readable storage medium of claim 18, wherein the second buffer size table covers only a subrange of the first buffer size table.

20. The non-transitory computer-readable storage medium of claim 18, wherein the second buffer size table provides finer granularity than the first buffer size table.

21. The non-transitory computer-readable storage medium 17, wherein a buffer size table associated with each transmitted BSR MAC CE is indicated by one of a first set of one or more LCIDs associated with the legacy type of BSR MAC CE or by one of a second set of one or more LCIDs associated with the new type of BSR MAC CE.

22. The non-transitory computer-readable storage medium of claim 17, wherein the instructions stored therein, when executed by the at least one processor, further cause the apparatus to perform:
determining that the first buffer size table is applicable for reporting the buffer status of a plurality of LCGs; and
reporting the buffer status of the plurality of LCGs with the legacy type of BSR MAC CE.

23. The non-transitory computer-readable storage medium of claim 17, wherein the instructions stored therein, when executed by the at least one processor, further cause the apparatus to perform following:
determining that different buffer size tables are required for reporting the buffer status of a plurality of LCGs having a non-zero buffer size; and
reporting the buffer status of the plurality of LCGs using the new type BSR MAC CE.

24. The non-transitory computer-readable storage medium of claim 17, wherein the instructions stored therein, when executed by the at least one processor, further cause the apparatus to perform following:
refraining from using the legacy type of BSR MAC CE for reporting buffer status of an LCG when a delay information report is configured for that LCG or for a logical channel within the LCG.

* * * * *